T864016

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1405

760,062

METHOD FOR REDUCING FOAMING TENDENCIES OF ALKALINE LIQUORS IN PAPERMAKING PROCESSES

Bobby N. Scoggins and Don R. Leonard, both of P.O. Box 511, Kingsport, Tenn. 37662

Filed Sept. 16, 1968. Published July 29, 1969
Int. Cl. D21c *3/28*
U.S. Cl. 162—72
No Drawing. 4 Pages Specification

The addition of phenylenediamines having alkyl substituents on the nitrogen atoms to the alkaline liquors of conventional papermaking processes reduces the tendency of such liquors to foam. The phenylenediamines are generally added in an amount of from 10 to 200 p.p.m.